United States Patent
Ito et al.

(10) Patent No.: US 7,070,333 B2
(45) Date of Patent: Jul. 4, 2006

(54) LUBRICATION STRUCTURE FOR ROLLING BEARING

(75) Inventors: Akira Ito, Tokyo (JP); Kimitoshi Sato, Yokohama (JP); Yuki Osada, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 10/767,006

(22) Filed: Jan. 30, 2004

(65) Prior Publication Data

US 2005/0077109 A1 Apr. 14, 2005

(30) Foreign Application Priority Data

Jun. 16, 2003 (JP) .............................. 2003-171324

(51) Int. Cl.
*F16C 33/66* (2006.01)
(52) U.S. Cl. .................. 384/473; 384/466; 384/475; 184/6.17
(58) Field of Classification Search ........ 384/472–475, 384/465, 566; 184/11.1–11.5, 6.17, 7.1; 60/39.08
See application file for complete search history.

(56) References Cited

U.S. PATENT DOCUMENTS

| | | | | |
|---|---|---|---|---|
| 2,712,967 A | * | 7/1955 | Sutton | ........................ 384/473 |
| 3,269,786 A | * | 8/1966 | Diver et al. | ................. 384/475 |
| 3,276,827 A | | 10/1966 | Diver et al. | |
| 4,453,784 A | * | 6/1984 | Kildea et al. | ................ 384/472 |
| 5,106,209 A | * | 4/1992 | Atkinson et al. | ........... 384/475 |
| 6,409,464 B1 | * | 6/2002 | Fisher et al. | ................. 384/475 |

FOREIGN PATENT DOCUMENTS

| | | |
|---|---|---|
| EP | 0391001 A1 | 10/1990 |
| GB | 1071855 | 6/1967 |
| JP | 2001-165178 | 6/2001 |

OTHER PUBLICATIONS

European Search Report in corresponding application EP 04001990.3 completed Dec. 20, 2005 and mailed Jan. 17, 2006.

* cited by examiner

*Primary Examiner*—Thomas R. Hannon
(74) *Attorney, Agent, or Firm*—Griffin & Szipl, P.C.

(57) ABSTRACT

A fin member is installed in an oil accumulating room. The fin member causes lubrication oil to follow rotation of the oil accumulating room so that the lubrication oil can be forcibly rotated. In this manner, a rotational speed difference between the oil accumulating room and the lubrication oil is made small, and an adequate oil supplying pressure is generated by the centrifugal force. As a result, a sufficient quantity of the lubrication oil can be supplied. Therefore, estimation of a supplying oil quantity becomes easy, and accuracy in prediction of the lubrication oil quantity actually used for the bearing lubrication can be improved.

13 Claims, 4 Drawing Sheets

LUBRICATION STRUCTURE FOR ROLLING BEARING

This application claims priority from Japanese Patent Application No. 171324/2003, filed Jun. 16, 2003, the entire disclosure of which is incorporated herein by reference.

BACKGROUND OF THE INVENTION

1. Field of the Invention

The present invention relates to a lubrication structure for a rolling bearing that is used for high speed rotation.

2. Description of the Related Art

By supplying lubrication oil to a rolling bearing, the rolling bearing is lubricated and cooled. A jet injection method and an inner ring lubrication method are known as a general method of lubricating the rolling bearing. FIGS. 1a and 1b show conventional lubrication structures of the rolling bearing. FIG. 1a shows the jet injection method, and FIG. 1b shows the inner ring lubrication method. In the drawings, the rolling bearing includes an inner ring 22a, an outer ring 22b, a plurality of rolling elements 22c installed between the inner ring 22a and the outer ring 22c, retainers 22d retaining the rolling elements 22c.

In the jet injection method, lubrication oil 21 is injected from a jet nozzle 25 toward the side of the inner ring 22a of the bearing. In such a lubrication structure, as indicated by the arrows in FIG. 1a, after lubricating the bearing, the lubrication oil 21 passes through the bearing, and is accumulated in a bearing room. The lubrication oil 21 in the bearing room is scavenged to the outside by an oil scavenge pump (not shown in the drawing). However, in such a lubrication structure for the jet injection method, the lubrication oil 21 strikes a side surface of the retainers 22d of the bearing, and rebounds therefrom. In addition, the rebounding lubrication oil interferes with further supplying of the lubrication oil 21. Therefore, there is a problem in that the lubrication oil cannot be smoothly supplied to the inside of the bearing.

On the other hand, a lubrication structure for the inner ring lubrication method shown in FIG. 1b includes a lubrication oil hole 23 that radially penetrates through the inner ring 22a of the bearing, and an oil accumulating room 26 of which rotational axis is positioned on a rotational axis of the rolling bearing and that accumulates the lubrication oil 21 by using a centrifugal force of the rotation of the oil accumulating room 26. The lubrication structure of FIG. 1b further includes a lubrication oil supplying path 24 that communicates with the oil accumulating room 26 and the lubrication oil hole 23. Accompanying the rotation of the shaft 27, the lubrication oil 21 accumulated in the oil accumulating room 26 is rotated, and the centrifugal force of the rotated lubrication oil generates an oil supplying pressure. The generated oil supplying pressure causes the lubrication oil 21 to be supplied to the inside of the bearing via the lubrication oil supplying path 24 and the lubrication oil hole 23. According to this inner ring lubrication method, the lubrication oil can be supplied directly to the inside of the bearing, so that it is possible to more smoothly supply the lubrication oil than in the case of the lubrication structure for the above-mentioned jet injection method. A technique concerning such an inner ring lubrication method is disclosed in the following Patent Literature 1.

[Patent Literature 1]

Japanese Patent Official Publication No. 165178, 2001

However, even in the lubrication means using the above-mentioned inner ring lubrication method, there is a rotational speed difference between the oil accumulating room 26 and the lubrication oil 21, so that an adequate oil supplying pressure cannot be generated. For this reason, there is a problem in that there is a case where a sufficient quantity of lubrication oil actually used for the bearing lubrication cannot be obtained. Furthermore, since the rotational speed difference between the oil accumulating room and the lubrication oil is unknown, it is difficult to estimate a supplying quantity of lubrication oil. Therefore, there is a problem in that prediction of the lubrication oil quantity that is actually used for the bearing lubrication results in low accuracy.

SUMMARY OF THE INVENTION

The present invention was made to solve the above-mentioned problems. It is a first object of the present invention to enhance a cooling effect of a bearing by decreasing a rotational speed difference between an oil accumulating room and lubrication oil, and thereby increasing an oil quantity actually used for the bearing lubrication. Further, it is a second object of the present invention to provide a bearing lubrication structure that makes it easy to estimate a supplying quantity of lubrication oil and that improves accuracy in prediction of the lubrication oil quantity actually used for the bearing lubrication.

In order to achieve the above objects, according to the present invention, there is provided a lubrication structure for a rolling bearing, comprising:

a lubrication oil hole that radially penetrates through an inner ring of the rolling bearing;

an oil accumulating room of which rotational axis is the same as a rotational axis of the rolling bearing and that accumulates lubrication oil by using a centrifugal force thereof;

a lubrication oil supplying path that communicates with the oil accumulating room and the lubrication oil hole; and a fin member that is installed in the oil accumulating room and causes the lubrication oil to follow rotation of the oil accumulating room so that the lubrication oil is forcibly rotated, wherein an oil supplying pressure generated by the centrifugal force causes the lubrication oil in the oil accumulating room to be supplied to an inside of the rolling bearing via the lubrication oil supplying path and the lubrication oil hole.

By this structure of the present invention, the fin member installed in the oil accumulating room causes the lubrication oil in the oil accumulating room to follow the rotation of the oil accumulating room so that the lubrication oil can be forcibly rotated. Accordingly, a rotational speed difference between the oil accumulating room and the lubrication oil can be made small. Therefore, a centrifugal force applied on the lubrication oil can be increased, the lubrication oil quantity actually used for the bearing lubrication can be increased, and a cooling effect of the bearing can be enhanced.

Preferably, the fin member extends in a radial direction and an axial direction.

By this structure, a forcible force that causes the lubrication oil to rotate can be increased, and a difference in the number of revolutions between the oil accumulating room and the lubrication oil can be effectively reduced. Therefore, a lubrication oil quantity actually used for the bearing lubrication can be increased, and a cooling effect of the bearing can be reliably enhanced. Further, in accordance with a rotational speed of the oil accumulating room, the centrifugal force of the lubrication oil is increased, and a supplying quantity of lubrication oil can be determined. Therefore, it becomes easy to estimate a supplying quantity of lubrication oil, and it is possible to improve accuracy in prediction of lubrication oil quantity that is actually used for the bearing lubrication.

Preferably, the fin member is installed at a plurality of positions in a circumferential direction.

By providing a plurality of fin members in the circumferential direction, the forcible force that causes the lubrication oil to rotate can be further increased, and the difference in the number of revolutions between the lubrication oil and the oil accumulating room can be further reduced. Therefore, the lubrication oil quantity actually used for the bearing lubrication can be further increased, and the cooling effect of the bearing can be further effectively improved. In addition, it is possible to further improve accuracy in prediction of the lubrication oil quantity actually used for the bearing lubrication.

Furthermore, the present invention can also provide a machine that uses a rolling bearing and has the above-described lubrication structure for the rolling bearing. For example, this machine is a gas-turbine engine or a supercharger. However, this machine is not limited to these machines and may be any machine to which the above-described lubrication structure can be applied.

Other objects, features, and advantages of the present invention will become apparent from the following description with reference to the attached drawings.

DESCRIPTION OF THE PREFERRED EMBODIMENTS

In the following, a preferred embodiment of the present invention is described with reference to the attached drawings.

Figure 1A:
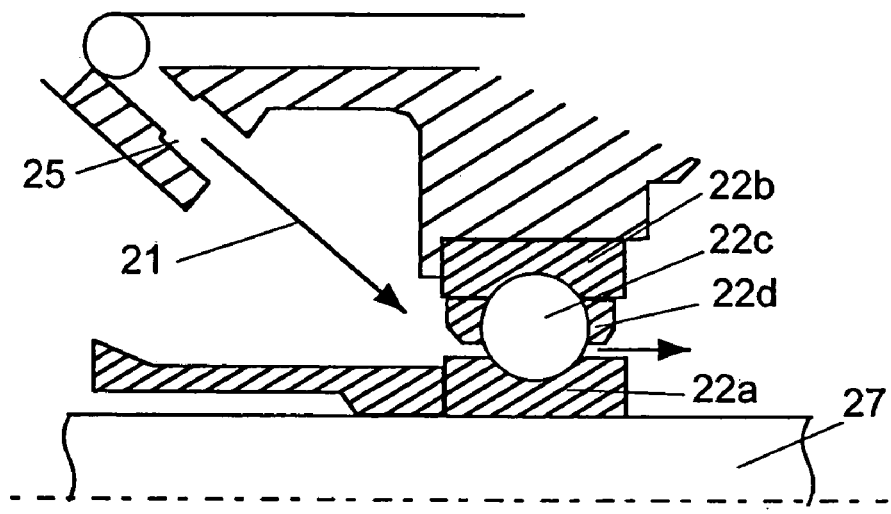
FIGS. 1a and 1b show conventional lubrication structures for a rolling bearing.
Figure 1B:
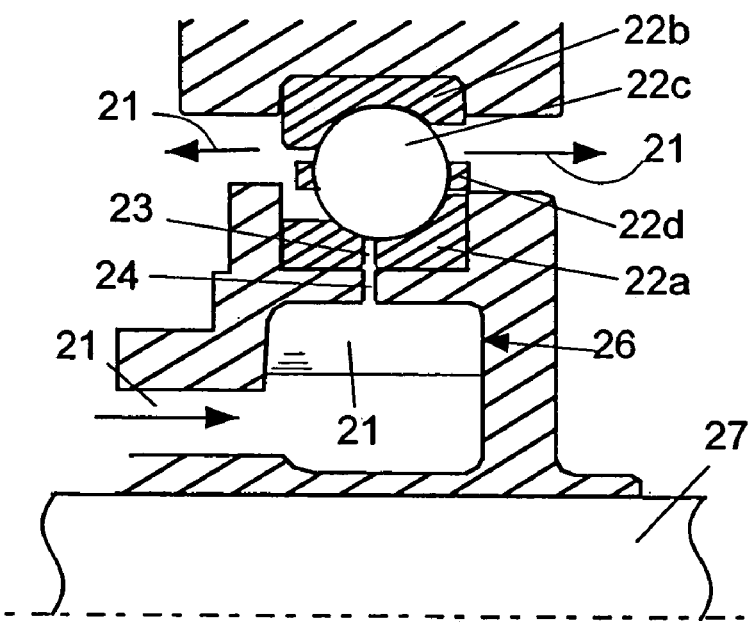
Figure 2:
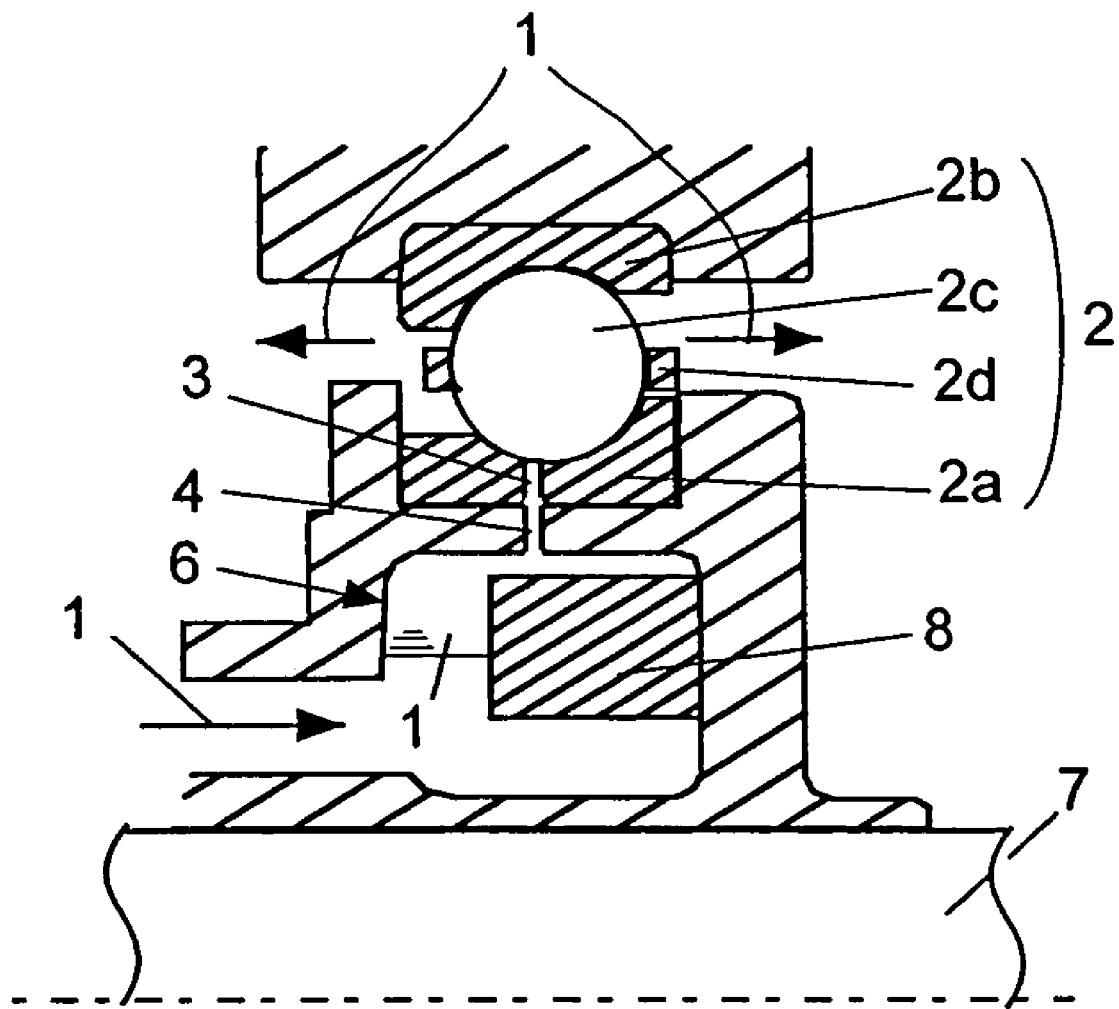
FIG. 2 shows an embodiment of the present invention.

FIG. 2 shows an embodiment of a bearing lubrication structure according to the present invention. In the drawing, the reference numeral 2 designates a rolling bearing. The rolling bearing 2 includes an inner ring 2a, an outer ring 2b, a plurality of balls 2c installed between the inner ring 2a and the outer ring 2b, and retainers 2d that retains the balls 2c. An oil accumulating room 6 that accumulates lubrication oil 1 is provided at a radial inner side of the inner ring 2a. The oil accumulating room 6 forms an annular space that extends in the circumferential direction around a central shaft 7. Lubrication oil holes 3 that radially penetrate through the inner ring 2a are respectively formed in the inner ring at a plurality positions in the circumferential direction. Corresponding to the lubrication oil holes 3, lubrication oil supplying paths 4 that communicate with the oil accumulating room 6 and the lubrication oil holes 3.

It should be noted that in this specification, the term "a rolling bearing" includes a ball bearing and a roller bearing, the term "an axial direction" means an axial direction of a bearing 2, a shaft 7 or the like, the term "a radial direction" means a radial direction of the bearing 2, the shaft 7 or the like, and the term "circumferential direction" means a circumferential direction of the bearing 2, the shaft 7 or the like.

Furthermore, platy fin members 8 that extend in the axial direction and the radial direction are formed on an inner surface of the oil accumulating room 6. In this embodiment, four fin members 8 are installed in the oil accumulating room 6 along the circumferential direction.

In this structure, when the lubrication oil 1 supplied from the direction indicated by the arrow in the drawing flows into the oil accumulating room 6, the lubrication oil 1 rotates accompanying the rotation of the oil accumulating room 6. At this time, the lubrication oil 1 is forcibly rotated by the fin members 8, so that it is possible to almost remove a rotational speed difference between the oil accumulating room 6 and the lubrication oil 1. In other words, the lubrication oil 1 is forcibly rotated by the fin members 8 to be accelerated up to almost the same speed as the rotational speed of the oil accumulating room 6. In this manner, an adequate oil supplying pressure can be generated, and a sufficient quantity of the lubrication oil 1 can be actually supplied to the bearing 2. This advantage was confirmed by a test described later. Therefore, a lubrication state of the bearing can be improved, and a cooling effect of the bearing can be enhanced. Furthermore, in accordance with the rotational speed of the oil accumulating room 6, a centrifugal force of the lubrication oil is increased, and a supplying oil quantity is determined. Accordingly, it becomes easy to estimate a supplying quantity of lubrication oil, and it is possible to improve accuracy in prediction of the lubrication oil quantity actually used for the bearing lubrication.

In this embodiment, only one end portion of the fin member 8 in the axial direction is fixed on the inner surface of the oil accumulating room 6. However, the present invention is not limited to this embodiment, and it is preferable to appropriately determine a fixing position depending on a shape, a size, or the like of the oil accumulating room 6. For example, front and rear end portions (right and left end portions in the drawing) of the fin member, or an end portion of the fin member at the side of the shaft 7 (a lower end portion in the drawing) is fixed on the inner surface of the oil accumulating room 6. Further, the number of the fin members is not limited to four, a shape of the fin member is not limited to a rectangle, and the number and shape of the fin member is determined depending on the shape and size of the oil accumulating room 6.

[Embodied Example]

In order to confirm advantages of the bearing lubrication structure according to the present invention, the following test was performed.

Figure 3A:
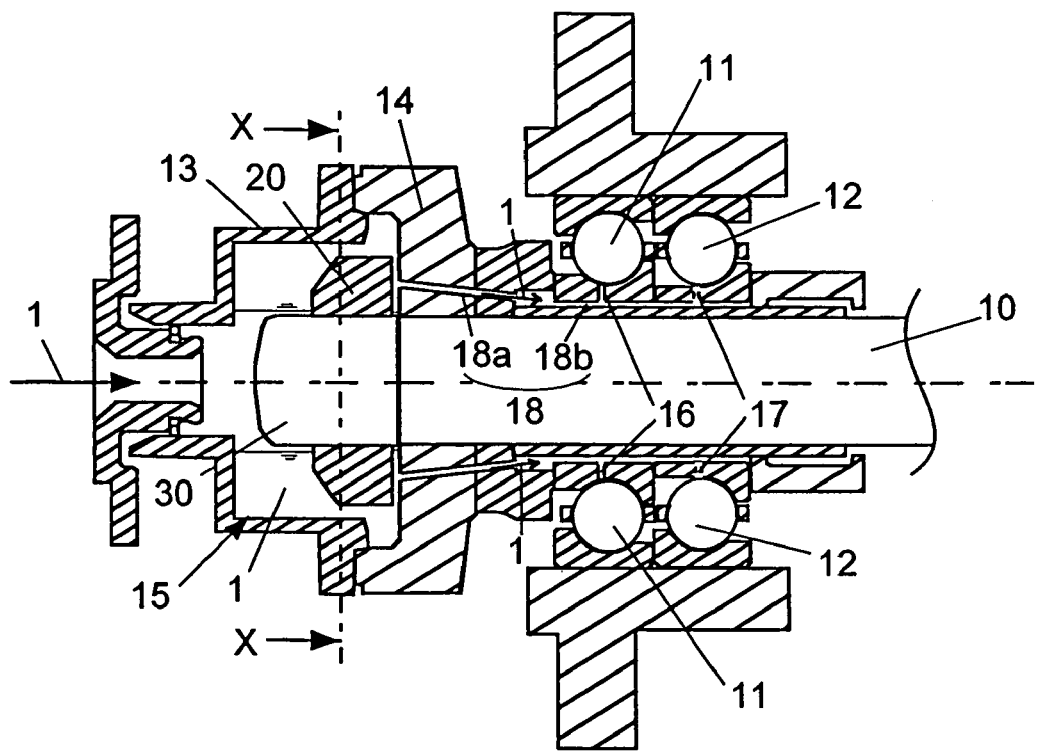
FIGS. 3a and 3b show an embodied example according to the present invention.
Figure 3B:
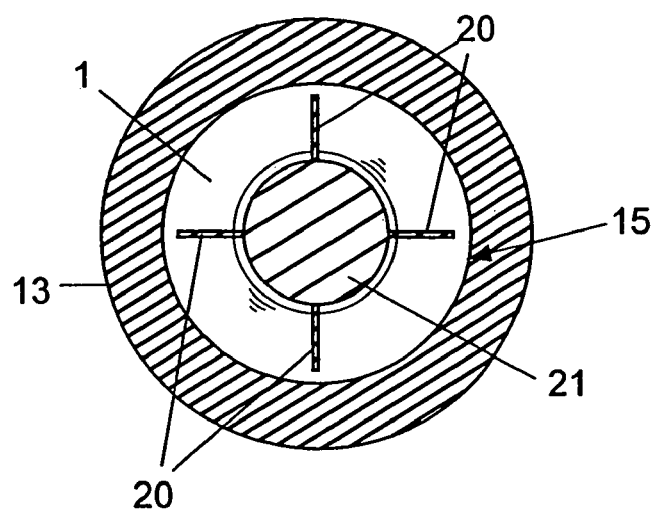

FIG. 3a is a sectional view showing an embodied example of the bearing lubrication structure according to the present invention. FIG. 3b is a cross sectional view taken along the line X—X in FIG. 3a. A bearing in this embodied example is applied to a supercharger for a boat, ship or vessel. In the drawings, the reference numeral 10 designates a shaft, 11 a four contact point ball bearing, 12 an angular ball bearing, 13 a cylindrical rotary cup having a cavity, and 14 a disk member. A space defined by the rotary cup 13, the disk member 14, and a shaft end nut 30 of the shaft 10 forms an oil accumulating room 15. The reference numerals 16 and 17 designate lubrication oil holes that supply the lubrication oil to the inside of the bearing and radially penetrate through the inner rings 11 and 12, respectively. The lubrication oil holes 16 and 17 are formed at a plurality of positions in the inner rings 11 and 12 in the circumferential direction thereof. The reference numeral 18 designate a lubrication oil supplying path that communicates with the oil accumulating room 15 and the oil supplying holes 16 and 17. Accordingly, the lubrication oil can flow from the oil accumulating room 15 to the oil supplying holes 16 and 17 via the lubrication oil supplying path 18. The lubrication oil supplying path 18 includes a flow path 18a that penetrates through the disk member 14, and a flow path 18b that corresponds to the bearings 11 and 12. The flow path 18a is formed to incline relative to the shaft 10 such that a distance between one end opening of the flow path 18a at the side of the oil accumulating room 15 and the central axis of the shaft 10 is larger than a distance between the other end of the flow path 18a connected to the flow path 18b and the central axis of the shaft 10.

The reference numeral 20 designates a fin member having a thickness of 0.1 mm. The fin member 20 is fixed on an outer surface of the shaft end nut 30 so as to extend in the axial direction and the radial direction. As shown in FIG. 3b, four fin members 20 are installed by spot welding at respective positions of the circumferential direction.

The lubrication oil 1 supplied from the direction indicated by the arrow in FIG. 3b flows into the oil accumulating room 15, and is forcibly rotated by the rotating fin members 20. By the centrifugal force, the forcibly rotated lubrication oil 1 is accumulated in the oil accumulating room 15 from the outer side position of the radial direction. When the surface of the lubrication oil in the oil accumulating room 15 reaches the inner side of the inner rings of the bearings 11 and 12, an oil supplying pressure is generated by the centrifugal force. The generated oil supplying pressure causes the lubrication oil to flow into the insides of the bearings 11 and 12 via the lubrication oil supplying path 18 and the lubrication oil holes 16, 17 so that the bearings 11 and 12 can be lubricated.

Figure 4:
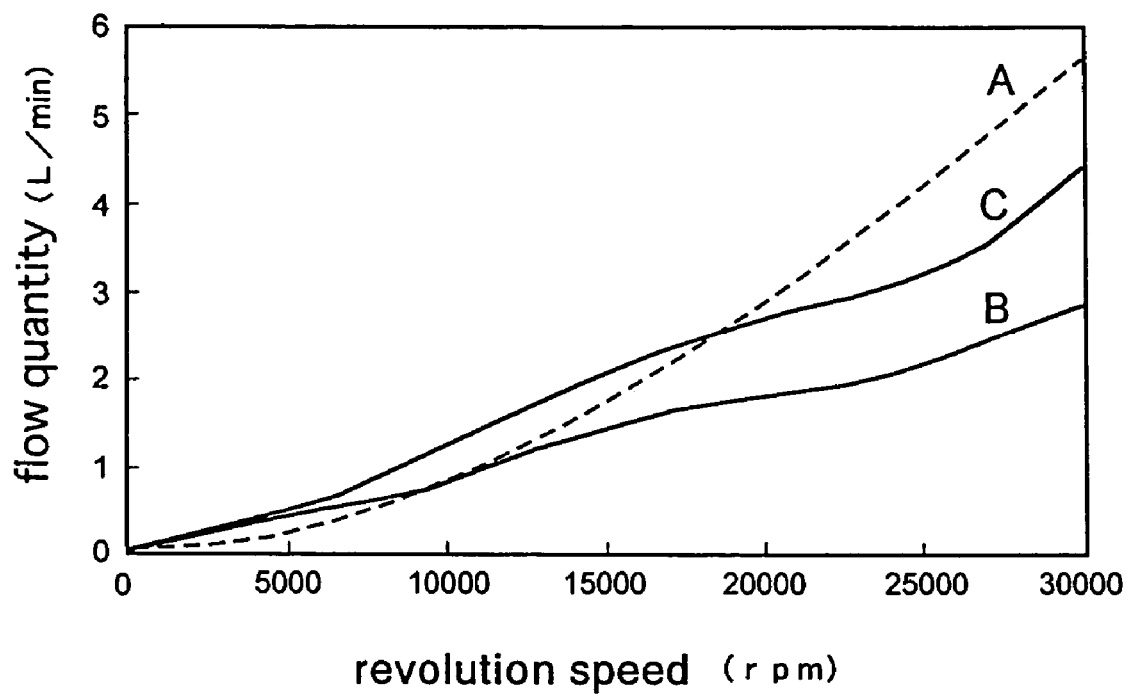
FIG. 4 shows one example of a test result according to the present invention.

FIG. 4 shows a result of the test performed by the embodied example of the bearing lubrication structure according to the present invention. In FIG. 4, the horizontal axis indicates revolution speed (revolutions per minute) of the shaft 10, and the vertical axis indicates a flow quantity of the lubrication oil that flowed into the insides of the bearings 11, 12. In the drawing, "A" designates theoretical calculated values, "B" designates a case where the fin members 20 were not installed, and "C" designates a case where the fin members 20 were installed.

As apparent from FIG. 4, the supplied oil quantity in the case where the fin members 20 were installed increased by half from the supplied oil quantity in the case where the fin members 20 were not installed. By this test, it was demonstrated that the rotational speed of the lubrication oil 1 was accelerated up to almost the same speed as the rotational speed of the oil accumulating room 15, the adequate oil supplying pressure was generated by the centrifugal force, and the sufficient quantity of the lubrication oil was actually supplied to the insides of the bearings. Accordingly, a lubrication state of the bearing can be greatly improved compared to the conventional lubrication state, and a cooling effect of the bearing can be enhanced. Further, in accordance with a rotational speed of the oil accumulating room, the centrifugal force of the lubrication oil is increased, and an oil supplying quantity is determined. Therefore, it becomes easy to estimate a supplying quantity of lubrication oil, and accuracy in prediction of the lubrication oil quantity actually used for the bearing lubrication can be improved.

As described above, according to the bearing lubrication structure of the present invention, it is possible to obtain the following excellent advantages.

(1) Since the fin members installed inside the oil accumulating room accelerates the rotational speed of the lubrication oil up to almost the same speed as the rotational speed of the oil accumulating room, an adequate oil supplying pressure can be generated by the centrifugal force, and a sufficient quantity of the lubrication oil can be actually used for the bearing lubrication. Therefore, the lubrication state of the bearing can be improved, and the cooling effect of the bearing can be enhanced.

(2) Since the rotational speed of the lubrication oil in the oil accumulating room becomes the same speed as that of the oil accumulating room, a pressure rise of the lubrication oil can be estimated, and accuracy in prediction of a lubrication oil quantity actually used for the bearing lubrication can be improved.

The bearing lubrication structure according to the present invention is not limited to the lubrication structure for the ball bearing such as the above-described embodiment and embodied example, and can be applied to a lubrication structure for a roller bearing. Furthermore, the lubrication structure for the bearing can also be applied to other high speed rotary machine. Of course, various modifications of the embodiment of the present invention can be made without departing from a scope of the present invention.

What is claimed is:

1. A lubrication structure for a rolling bearing, comprising:
    a lubrication oil hole that radially penetrates through an inner ring of the rolling bearing;
    an oil accumulating room of which rotational axis is the same as a rotational axis of the rolling bearing and that accumulates lubrication oil by using a centrifugal force thereof, wherein the oil accumulating room forms an annular space that extends in a circumferential direction around a central shaft;
    a lubrication oil supplying path that communicates with the oil accumulating room and the lubrication oil hole; and
    a fin member that is installed in the oil accumulating room so only one end portion of the fin member in an axial direction is fixed on an inner surface of the oil accumulating room, and the fin member causes lubrication oil to follow rotation of the oil accumulating room so that lubrication oil is forcibly rotated,
    wherein an oil supplying pressure generated by the centrifugal force causes the lubrication oil in the oil accumulating room to be supplied to an inside of the rolling bearing via the lubrication oil supplying path and the lubrication oil hole.

2. The lubrication structure for the rolling bearing according to claim 1, wherein the fin member extends in a radial direction and the axial direction.

3. The lubrication structure for the rolling bearing according to claim 2, wherein the fin member is installed at a plurality of positions in a circumferential direction.

4. A machine that uses a rolling bearing and has a lubrication structure for the rolling bearing, wherein the lubrication structure comprises:
    a lubrication oil hole that radially penetrates through an inner ring of the rolling bearing;
    an oil accumulating room of which rotational axis is the same as a rotational axis of the rolling bearing and that accumulates lubrication oil by using a centrifugal force thereof, wherein the oil accumulating room forms an annular space that extends in a circumferential direction around a central shaft;

a lubrication oil supplying path that communicates with the oil accumulating room and the lubrication oil hole; and a fin member that is installed in the oil accumulating room so only one end portion of the fin member in an axial direction is fixed on an inner surface of the oil accumulating room, and the fin member causes lubrication oil to follow rotation of the oil accumulating room so that lubrication oil is forcibly rotated, wherein an oil supplying pressure generated by the centrifugal force causes the lubrication oil in the oil accumulating room to be supplied to an inside of the rolling bearing via the lubrication oil supplying path and the lubrication oil hole.

5. The machine according to claim 4, wherein the machine is a gas-turbine engine or a supercharger.

6. A lubrication structure for a rolling bearing, comprising:

a first lubrication oil hole that radially penetrates through a first inner ring of the rolling bearing;

a second lubrication oil hole that radially penetrates through a second inner ring of the rolling bearing, wherein the first inner ring and the second inner ring are disposed along a central axis of a shaft;

an oil accumulating room having a rotational axis that is the same as a rotational axis of the rolling bearing;

a lubrication oil supplying path that communicates with the oil accumulating room, the first lubrication oil hole and the second lubrication oil hole; and a fin member that is installed in the oil accumulating room and causes lubrication oil to follow rotation of the oil accumulating room so that lubrication oil is forcibly rotated, wherein the fin member is fixed on an outer surface of a shaft end nut of the shaft so as to extend in an axial direction and in a radial direction, and wherein an oil supplying pressure generated by the centrifugal force causes lubrication oil in the oil accumulating room to be supplied to an inside of the rolling bearing via the lubrication oil supplying path, the first lubrication oil hole and the second lubrication oil hole.

7. The lubrication structure for the rolling bearing according to claim 6, wherein the oil accumulating room is formed by a space defined by a rotary cup having a cavity, a disk member and the shaft end nut.

8. The lubrication structure for the rolling bearing according to claim 7, wherein the lubrication oil supplying path includes a first flow path that penetrates through the disk member and a second flow path that that communicates with the first lubrication oil hole and the second lubrication oil hole.

9. The lubrication structure for the rolling bearing according to claim 8, wherein the first flow path communicates with the oil accumulating room and the first flow path is inclined relative to the shaft so a first distance between an end opening of the first flow path communicating with the oil accumulating room and the central axis of the shaft is larger than a second distance between another end opening of the first flow path and the central axis of the shaft.

10. A supercharger comprising a lubrication structure for a rolling bearing, wherein the lubrication structure comprises:

a first lubrication oil hole that radially penetrates through a first inner ring of the rolling bearing;

a second lubrication oil hole that radially penetrates through a second inner ring of the rolling bearing, wherein the first inner ring and the second inner ring are disposed along a central axis of a shaft;

an oil accumulating room having a rotational axis that is the same as a rotational axis of the rolling bearing;

a lubrication oil supplying path that communicates with the oil accumulating room, the first lubrication oil hole and the second lubrication oil hole; and a fin member that is installed in the oil accumulating room and causes lubrication oil to follow rotation of the oil accumulating room so that lubrication oil is forcibly rotated, wherein the fin member is fixed on an outer surface of a shaft end nut of the shaft so as to extend in an axial direction and in a radial direction, and wherein an oil supplying pressure generated by the centrifugal force causes lubrication oil in the oil accumulating room to be supplied to an inside of the rolling bearing via the lubrication oil supplying path, the first lubrication oil hole and the second lubrication oil hole.

11. The lubrication structure for the rolling bearing according to claim 10, wherein the oil accumulating room is formed by a space defined by a rotary cup having a cavity, a disk member and the shaft end nut.

12. The lubrication structure for the rolling bearing according to claim 11, wherein the lubrication oil supplying path includes a first flow path that penetrates through the disk member and a second flow path that that communicates with the first lubrication oil hole and the second lubrication oil hole.

13. The lubrication structure for the rolling bearing according to claim 12, wherein the first flow path communicates with the oil accumulating room and the first flow path is inclined relative to the shaft so a first distance between an end opening of the first flow path communicating with the oil accumulating room and the central axis of the shaft is larger than a second distance between another end opening of the first flow path and the central axis of the shaft.

* * * * *